United States Patent [19]

Ueda et al.

[11] Patent Number: 4,592,534
[45] Date of Patent: Jun. 3, 1985

[54] VALVE ASSEMBLY

[75] Inventors: Tomoyuki Ueda; Hirotoshi Ogawa, both of Nobeoka, Japan

[73] Assignee: Asahi Yukisai Kogyo Co. Ltd., Nobeoka, Japan

[21] Appl. No.: 561,699

[22] Filed: Dec. 15, 1983

Related U.S. Application Data

[63] Continuation-in-part of Ser. No. 326,010, Nov. 30, 1981, abandoned, which is a continuation-in-part of Ser. No. 177,613, Aug. 13, 1980, abandoned.

[30] Foreign Application Priority Data

Aug. 13, 1980 [JP] Japan ............................. 55-45998

[51] Int. Cl.$^4$ ............................................. F16K 31/44
[52] U.S. Cl. ..................... 251/266; 251/327; 251/368
[58] Field of Search ............... 251/266, 368, 326, 327, 251/324, 267, 328

[56] References Cited

U.S. PATENT DOCUMENTS

| | | | |
|---|---|---|---|
| 3,185,437 | 5/1965 | Rice | 251/368 |
| 3,829,061 | 8/1974 | Payne et al. | 251/368 |
| 3,938,779 | 2/1976 | Benjamin | 251/328 |
| 4,225,115 | 9/1980 | Miller | 251/327 |
| 4,240,462 | 12/1980 | Bankstahl | 137/315 |

FOREIGN PATENT DOCUMENTS 100156 2/1937 Australia ............................. 251/266

Primary Examiner—A. Michael Chambers
Attorney, Agent, or Firm—Armstrong, Nikaido, Marmelstein & Kubovcik

[57] ABSTRACT

A valve assembly which includes a valve body made of a hard synthetic resin, preferably PVC or PVDF. The valve body is formed with a fluid passage laterally extending therethrough, and having no flanges for connection with neighboring pipings. There is a valve member for the cooperation with the valve body, the valve member has nearly a true cylindrical outer configuration, having a taper of 1/30–1/10. A shallow concave groove or recess is formed in the bottom wall surface of the valve member kept in fluid communication with the axial bore formed in the latter. The material of the valve member is selected to be softer than that of the valve body for securing benefit for aquiring better wearing characteristics in cooperation with the valve seats. This material is preferably polypropylene. The working surface of the valve member has a generally convex-cured configuration and the valve seat of the valve body has a concave configuration mating therewith.

4 Claims, 6 Drawing Figures

VALVE ASSEMBLY

CROSS-REFERENCE OF RELATED APPLICATION

This application is a Continuation-In-Part application of our co-pending Application Ser. No. 326,010 filed Nov. 30, 1981 by the same inventors, now abandoned, under claiming Convention rights from Japanese Patent Application No. 55-45998 filed Apr. 8, 1980 in Japan, which is a Continuation-In-Part application of our co-pending Application Ser. No. 177,613 filed Aug. 13, 1980 now abandoned. We also claim in the present application, the above-mentioned Convention rights from the said Japanese patent application.

BACKGROUND OF THE INVENTION

This invention relates generally to improvements in and relating to valve assemblies, for stopping, regulating and opening fluid passage in the valve. The kind of fluid may be gas, steam or liquid. However, the liquid is best for being handled by the valve assembly according to the present invention.

Conventional valve cocks, or more preferably cocks have a cone-shaped cock proper as its valve member. The cock proper has a lateral fluid passage opening therethrough for allowing, regulating or stopping fluid flow therethrough, depending upon the selected position of the cock proper relative to valve seats formed in the cock body housing the cock proper. For control of the fluid flow, the cock proper is rotated around its axis as desired.

On account of rotational manipulation of the cock proper, effective seal can not always be assured so that fluid leakages may occur rather frequently.

In order to obtain effective seal between the cock proper and its mating seats, strong thrust must be applied to the cock proper, thereby the latter is held in rather high pressure contact with the seats. This fact may frequently lead to mechanical and mostly localized damages of the seat surfaces.

As an advantage of this kind of valves, however, substantially undisturbed fluid passage can be established when the cock is manipulated to its full-open position.

As another kind of valve assembly somewhat similar to the objects of the present invention, conventional gate valves may be referred to. This kind of valve has a slidable gate as its valve member movable perpendicularly to the fluid passage which is formed laterally through the valve body. It should be mentioned, however, that each of the two valve-seating areas is rather small on account of its arrangement on an ideal plane which is in coincidence with the wedging operating surface of the gate. In this case, however, localized stress concentration, wear an fluid leakage can not be avoided on the valve seat surface during extending service and frequent on-off operations of the valve.

Therefore, the main object of the present invention is to provide an improved valve assembly representing an idealized combination of the gate valve and the valve cock in its essence, providing thereby a substantially broaded valve seat area, a smoother fluid passage and a lighter on-off control possibility.

For this purpose, the invention proposes such an improved valve assembly comprising a valve body unit having a fluid passage laterally arranged therethrough; a non-rotatably valve member movable within the valve body perpendicular to said fluid passage and holdable at any position at and between a full-closing position and a full-opening position relative to said fluid passage; said valve member taking a shape close to a true cylinder and having a taper of 1/30–1/10; and a valve-operating mechanism mounted rotatably in said valve body and kept in thread engagement with said valve member.

The valve body and the valve member are made of hard synthetic resin. It has been found that a better and smoother valve-operating possibility is obtained when the material of the valve member is softer than that of the valve body.

In this respect, PVC and PVDF are highly recommendable for the valve body, while polypropylene resin is highly recommendable for the valve member.

A pair of circularly closed and opposedly arranged ridge projections are cast on the outer surface of the valve member in such a way that these are brought into a sealing engagement with the valve seats when the valve member has been brought into its closing position.

There is provided a shallow concave recess formed in the bottom wall surface of said valve member and kept in fluid connection with the axial bore of the latter adapted for avoiding fluid trapping which may otherwise occur when said valve member is being brought into its closing position.

The valve member is connected with the valve gear through threaded connection via a valve spindle or stem, the latter being comprised of a resin sheath element and a metal core shaft, so as to increase the rigidity of the valve spindle.

The said valve member may be formed with a pair of radially opposite projections which are kept in slidable engagement with a pair of parallel guide grooves arranged in the interior of said valve unit and perpendicular to said fluid passage.

The valve member may be made hollow for providing an idle space adapted for allowing trapped fluid which is present at the last stage of a valve closing operation, to escape thereinto, thus making the valve-closing action lighter than otherwise.

The working end of the valve member may be made preferably and generally concave, so as to allow the treating fluid flow in an undisturbed manner when the valve member is positioned at its full-open position.

Each of valve seats practically and partially defining a fluid inlet opening and a fluid outlet opening arranged in line in the valve body, takes the form of a circular ring developed on as only slightly coned surface close to that of a true cylinder which surface is taken by operating part of the valve member. In this way, the valve seat surface may be substantially broadened in comparison with that of the correspondingly sized gate valve.

If both the valve member and the valve body are made of metal, the precise grind-in operation must be employed for the realization of an optimum seating effect in the fluid stop and sealing position of the valve assembly. This will cause naturally an uneconomical production efficiency. At the same time, such an inconvenience that the valve operating torque will become substantially high is met. When, for avoiding this disadvantageous effect by selecting proper plastics for the both main valve constituents, the valve body will become bulged out under the influence of the operating fluid pressure. This will cause to invite a fluid leak gap between the valve member and the seat.

This ill effect will become higher, when the fluid has elevated temperatures.

A second object of the invention is thus to provide an improved valve assembly adapted for suppressing the above disadvantage.

These and further objects, features and advantages of the invention will become more apparent when read the following detailed description of substantially a preferred embodiment of the invention with reference to the accompanying drawings in which

SUMMARY OF THE INVENTION

As a salient feature of the valve assembly comprising a movable valve member and a stationary valve housing, the said both main constituents are made of plastics. However, the valve member material is softer than the valve housing material. As the former PP (polypropylene) is highly recommended, as the latter, while PVC (polyvinylchloride) or PVDF (polyvinylidenefluoride). By adopting such measure as above, the valve member can more efficiently fit the valve seats, even in an elastic manner, on account of more resilient and more expandable nature of the valve member material than the valve housing material.

As a general concept, the general outer configuration of the valve member has a slightly tapered, generally cylindrical working surface, having a taper of 1/10–1/30 for exerting valve-closing axial force when seen in the direction of fluid flow.

In practice, however, the outer configuration of the valve member's working surface takes a bulge-out convex shape, so as substantially to satisfy the formula:

$$\frac{d_2 - d_1}{D} \times 100 = 0.2 - 1.5\% \quad (1)$$

preferably 0.3–1.2% when assuming that $d_1$ is the sectional diameter of the imaginary tapered surface of the valve member and $d_2$ is the real valve member, the both being measured on the axial fluid flow line of the valve assembly.

D denotes the sectional diameter of the fluid passage flow when seen within the valve body.

The corresponding shape of each of the valve seats is formed to satisfy equally the above mathematical formula. Thus, the general imaginary tapered configuration curve coincises with that of the valve member.

The working part of the valve member has a sectional outer configuration of a part of a large diameter circle for easy mechanical finishing job. However, if desired, it may be a parabolic, elliptic or the like one. Under every conditions, however, the largest dimensional offset from the slightly cone-like, imaginary cylindrical configuration of the valve member must be set substantially at the fluid flow center line.

DETAILED DESCRIPTION OF THE INVENTION

In the following, a preferred specific embodiment of the invention will now be illustrated in detail and in no limiting sense, with reference to the accompanying drawings FIGS. 1–5.

Numeral 1 represents a valve body, preferably made of a hard resin material such as PVC- or PVDF-resin and having inlet and outlet openings 101 and 102 separated from each other as shown. The defining surfaces 101a and 102a thereof are preferably tapered inwardly, so as to mate optimumly with male ends of corresponding pipe ends, not shown. Between these fluid passage openings 101 and 102, a valve chamber 103 is formed and normally kept in fluid communication with a shallow recess 103a cut into the bottom wall part 101 of the valve body 1. At the center of the latter, there is provided a tapered drain opening 104 which is normally closed by a closing screw nut 105. As shown, the valve body 1 has no pipe connection flanges and screws.

The valve body 1 has a vertical extension 106 formed substantially into a hollow cylindrical member, acting as a valve stem-supporting and guiding element, as will be later more fully described.

The extension 106 is formed with an end flange 107, a cylindrical bore space 109 and a pair of diametrally opposite guide grooves 109a and 109b.

The upper end of the extension 106 is closed by a cover plate 4. O-ring 9 is provided for establishing a fluid seal between the flange 107 and cover plate 4.

Figure 1:
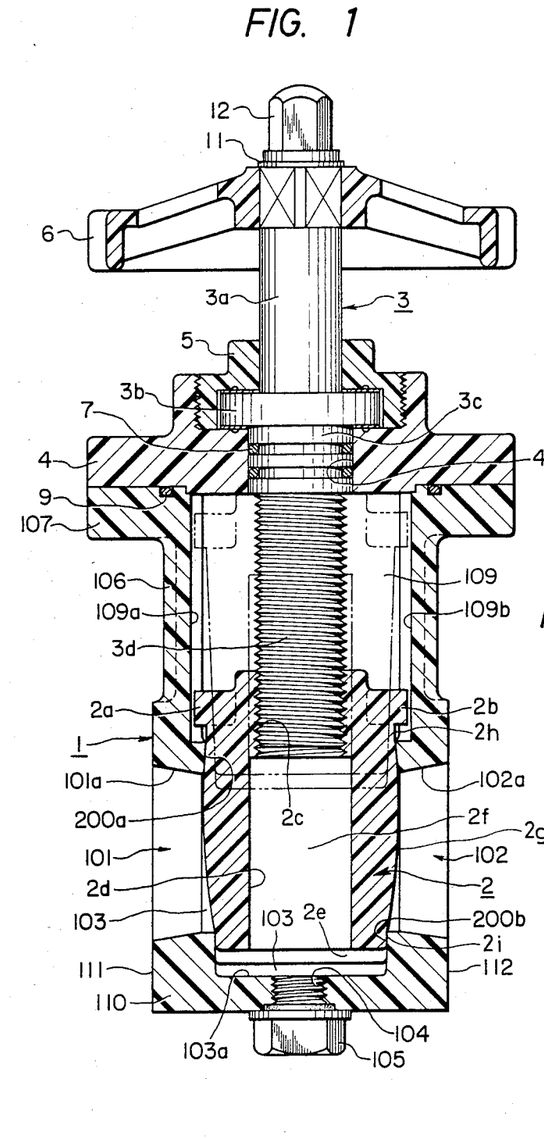
FIG. 1 is an axial section of a preferred embodiment of the invention.
Figure 1A:
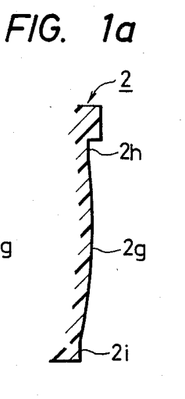
FIG. 1a is a part of FIG. 1, showing more clearly the outer surface of the valve member, the said surface substantially consisting of a main bulge-out convex portion and substantially straight end portions.

Numeral 2 represents a vertically slidable, non-rotatable valve member, preferably made of a hard plastics having in general a hollow, substantially cylindrical shape, having an imaginary taper of 1/30–1/10. In FIG. 1, the valve member is shown at its full closing position, while it is illustrated at its full open-position in chain-dotted line. However, the hardness of the material resin of valve member 2 is selected lower than that of valve body 1. For this purpose, any one of PP (polypropylene)-, PE (polyethylene)-, nylon-, PA (polyacetal)- and ABS-resin may be adopted for the valve member. According to our experimental results, when the hardness of the materials of valve body and valve member is equal, heavy wear and inferior sealability may be encountered, as more comparative experimental data will be shown hereinafter. In this respect, a combination of PVC- or PVDF-resin for the valve body with PP-resin for the valve member would be highly recommendable.

The outer surface of the valve member is substantially consisting of a main bulge-out convex portion 2g and substantially straight end portions 2h and 2i in continuation of the said main portion.

The valve member is formed nearly at its upper end with a pair of oppositely and outwardly extending projections 2a and 2b which are kept in slidable engagement with said longitudinal grooves 109a and 109b, respectively, thus the valve member being capable of vertically sliding movement between its uppermost full-open position shown in chain-dotted line and its lower full-closing position shown in full line, and thereby it being prevented from rotation about its central axis.

The valve member is formed further with an axial bore 2f comprising an upper female threaded portion 2c and a lower non-threaded portion 2d. At the bottom, the valve member is formed with a shallow concave recess 2e.

Valve operating rod 3 comprises an upper end portion 3a carrying fixedly a hand wheel 6; an enlarged flange portion 3b which is kept in position in rotatable manner by being squeezed by and between the cover plate 4 and a holder piece 5 kept in threaded engagement with the latter as shown; a bearing portion 3c passing through axial bore 4a of cover plate 4 and carrying O-rings 7 for establishing effective seal against the latter; and finally a male-threaded portion 3d which is kept in engagement with female-threaded portion 2c of valve member 2. Thus, it will be clear that by rotating the rod 3 in one or other direction by means of hand wheel 6, the valve member 2 is caused to move up or down, respectively, without making no rotational movement.

The rod 3 is molded with a core metal rod element 97 having a top male threaded end. The remaining part of the core rod element comprises generally and alternately raised polygonal, preferably hexagonal parts and reduced cylindrical parts. Nearly at the central region between the top and bottom ends of the core rod element, there is an elongated cylindrical portion, although not shown.

Figure 2:
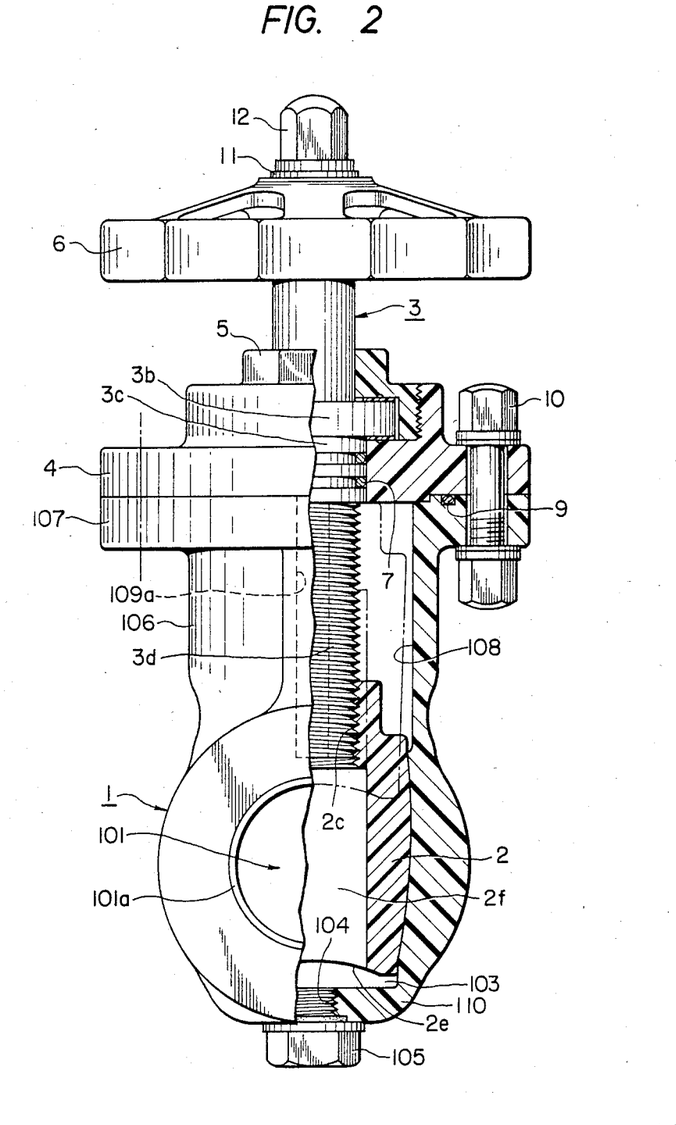
FIG. 2 is a partially sectioned end view thereof.
Figure 3:
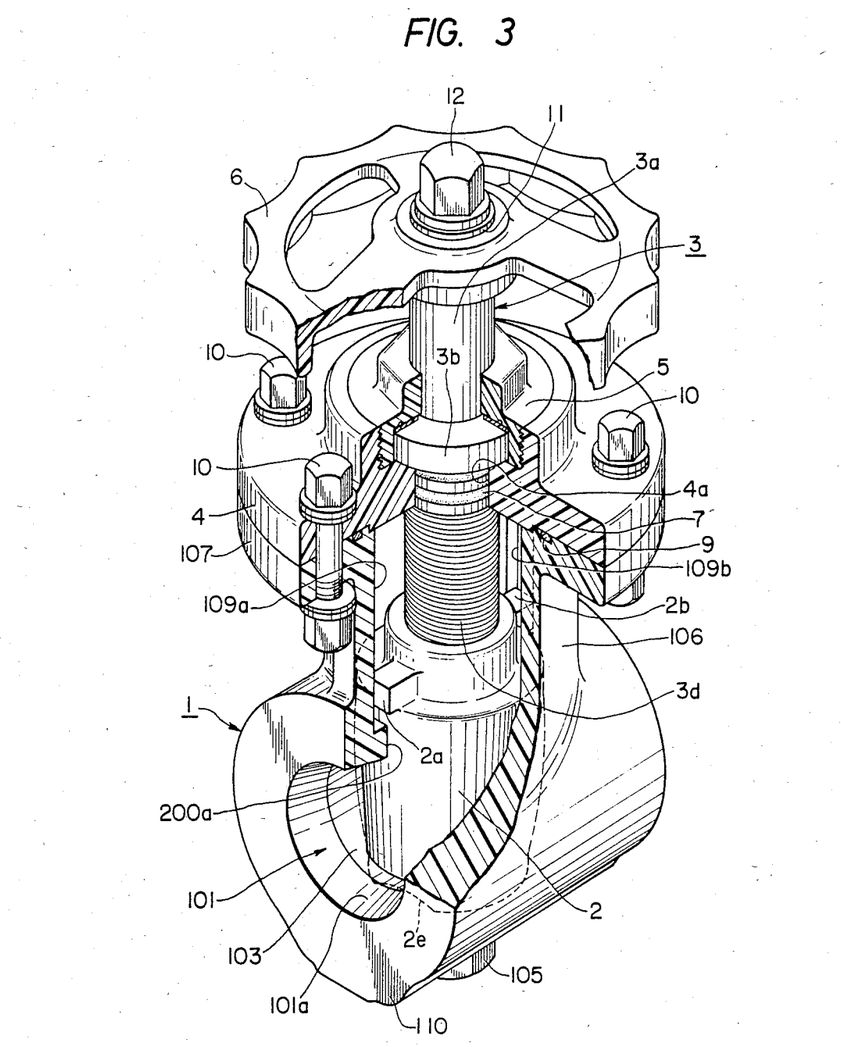
FIG. 3 is a perspective view of the valve assembly partially sectioned and partially broken away.
Figure 4:
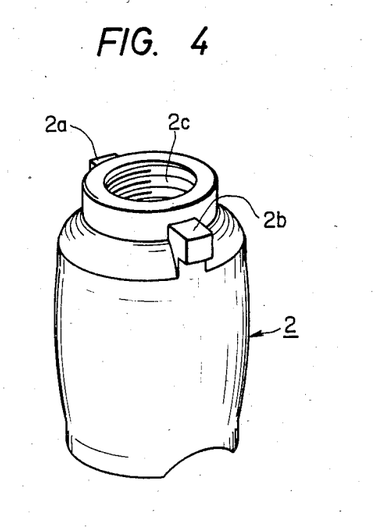
FIG. 4 is a perspective view of the valve member.

The exposing male threaded top end 97a is capped with a female-threaded nut 12 which is placed for fixing the hand wheel 6 on the rod 3 as conventionally, when the related valve parts have been assembled together as shown in FIGS. 1-3. Numeral 11 represents a spring washer which serves for the prevention of unintentional loosening of the nut 12.

As may be clearly seen from the drawings, the valve body 1 is formed with no connection flanges and no connection screws adapted for connection with both side or more specifically inlet and outlet flow piping, not shown. The valve body 1 is thus formed in the simplest style. For establishing the required fluid connection of the valve body with the both side pipings, the latter are formed with respective connection flanges, each of the latter being naturally formed with a plurality of bolt holes and the corresponding number of connection bolts are fitted through and between these both flanges for tight connection. In this case, the pipe flanges, not shown, are positioned beforehand in tight contact with vertically extending flat end surfaces 111 and 112 formed on the valve body around the inlet and outlet openings 101 and 102, respectively. The tightening bolts extend in this case in a bypassing way off from contacting relationship with the valve body.

The operation of the valve assembly is as follows:

When the valve is wanted to close, handle 6 is rotated in certain one direction such as clockwise when seen from upper and together with valve spindle 3 which can not perform any vertical movement as was referred to hereinbefore.

The valve member 2 which can not rotate, is lowered by this spindle rotation, for instance from its uppermost position shown in chain-dotted line in FIGS. 1-2, towards its lowermost position shown in full line, on account of its threaded engagement with the spindle.

Directly before bringing the valve member into its full closing position, the bottom thereof will come into contact with slightly tapered circumferential wall surface as at 200b of the shallow recess 103a formed in the bottom wall 113 of valve member, and since then, a quantity of the treating liquid is trapped in the recess, thus the latter otherwise acting as a trap exerting a heavy counter action against the vavle-closing operation, as in the case of similar conventional valves. However, the present valve assembly has its valve member having a hollow concentric space 2f communicating fluidically with the trap, thereby releasing the trapped liquid.

When the valve member is brought into its full closing position shown, the valve chamber 103 is interrupted from fluid communication with both inlet and outlet openings 101; 102, thereby a fluid passage through the valve assembly being perfectly shut off.

On the contrary, when the valve is to be opened, the handle 6 is rotated in the reverse or counter clockwise direction, so as to rotate the spindle in unison therewith, thereby elevating the valve member from its full closing position to its full open one as an example. Naturally, the valve member can be positioned at an intermediate half open position at will.

At the full open position of the valve member which is formed with a shallow recess 2e at the bottom, the fluid flow through the flow passage formed through the valve body can not be disturbed substantially in any way.

Figure 5:
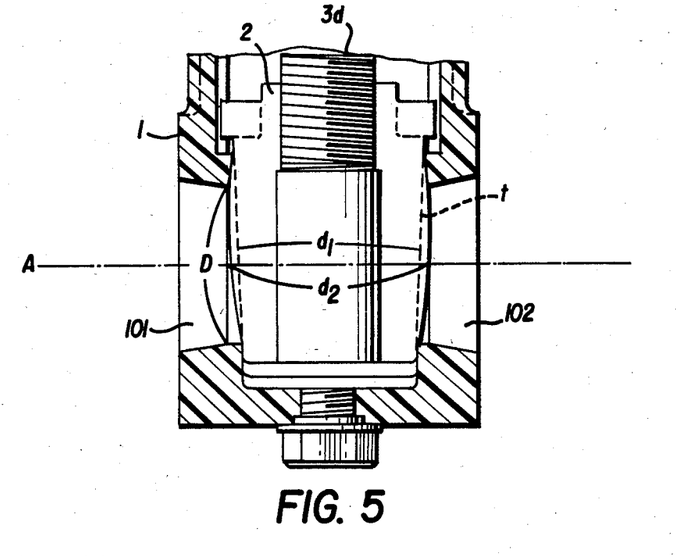
FIG. 5 is a partial view of the valve assembly showing the factors for determining the configuration of the working surface of the valve member.

The main part of the working outer surface of the valve member has a generally and convexedly curved surface 2g which is defined, as already mentioned by the said formula (1). The effect thereof has already been described herein. Substantially straight end portions 2h and 2i in continuation of the main portion 2g are provided for easier mechanical working thereof. The imaginary taper line basically defining the main portion 2g is shown by the dash line t in FIG. 5. FIG. 5 also shows the sectional diameter of the imaginary tapered surface of the valve member $d_1$, and the sectional diameter of the real valve member $d_2$, both sectional diameters $d_1$ and $d_2$ being measured on the axial fluid flow line of the valve assembly A. D is the sectional diameter of the fluid passage when seen within the valve body.

The working surface of the valve set is naturally of the mating one with that of the main portion 2g, although not illustrated specifically.

The embodiment of the invention in which an exclusive property or privilege is claimed are as follows:

1. A valve assembly comprising in combination a valve body made of a hard synthetic resin preferably PVC and having a fluid passage laterally arranged therethrough;

a non-rotatable, axially bored valve member made of a hard synthetic resin softer than that of the valve body and movable within the valve body perpendicular to said fluid passage and holdable at any position at and between a full-closing position and a full-opening position relative to said fluid passage, said valve member taking a general imaginary shape close to a true cylinder and having a taper of 1/10-1/30, the practical configuration thereof being generally of a convexedly curved one in the direction of its taper;

a pair of separated valve seats formed in said valve body unit and around said fluid passage, each having a generally tapered planar surface corresponding with the taper of the valve member; and a shallow concave recess formed on bottom wall surface of said valve member and kept in fluid connection with said axial bore of the latter adapted for avoiding fluid trapping which may otherwise occur when said valve member is being brought into its closing position; the material resin being softer than that of the valve body unit and preferably polypropylene.

2. A valve assembly of claim 1, wherein the generally and convexedly curved practical configuration of the valve member is defined substantially by the formula:

$$\frac{d_2 - d_1}{D} \times 100 = 0.2\text{--}1.5\%$$

preferably 0.3–1.2% when assuming the $d_1$ is the sectional diameter of the imaginary tapered surface of the valve member and $d_2$ is that of the real valve member, the both being measured on the axial fluid flow line of the valve assembly, and D denotes the sectional diameter of the fluid passage flow when seen within the valve body.

3. A valve assembly comprising in combination a valve body made of a hard synthetic resin preferably PVDF and having a fluid passage laterally arranged therethrough;

a non-rotatable, axially bored valve member made of a hard synthetic resin softer than that of the valve body and movable within the valve body perpendicular to said fluid passage and holdable at any position at and between a full-closing position and a full-opening position relative to said fluid passage, said valve member taking a general imaginary shape close to a true cylinder and having a taper of 1/10–1/30, the practical configuration thereof being generally of a convexedly curved one in the direction of its taper;

a pair of separated valve seats formed in said valve body unit and around said fluid passage, each having a generally tapered planar surface corresponding with the taper of the valve member; and a shallow concave recess formed on bottom wall surface of said valve member and kept in fluid connection with said axial bore of the latter adapted for avoiding fluid trapping which may otherwise occur when said valve member is being brought into its closing position; the material resin being softer than that of the valve body unit and preferably polypropylene.

4. A valve assembly of claim 3, wherein the generally and convexedly curved practical configuration of the valve member is defined substantially by the formula:

$$\frac{d_2 - d_1}{D} \times 100 = 0.2\text{--}1.5\%$$

preferably 0.3–1.2% when assuming that $d_1$ is the sectional diameter of the imaginary tapered surface of the valve member and $d_2$ is that of the real valve member, the both being measured on the axial fluid flow line of the valve assembly, and D denotes the sectional diameter of the fluid passage flow when seen within the valve body.

* * * * *

UNITED STATES PATENT AND TRADEMARK OFFICE
CERTIFICATE OF CORRECTION

PATENT NO. : 4,592,534
DATED : June 3, 1986
INVENTOR(S) : Tomoyuki UEDA et al

It is certified that error appears in the above-identified patent and that said Letters Patent is hereby corrected as shown below:

On the cover page, Item [45], "June 3, 1985" should read --June 3, 1986--.

Signed and Sealed this

Thirtieth Day of September 1986

[SEAL]

Attest:

DONALD J. QUIGG

Attesting Officer

Commissioner of Patents and Trademarks